# 2,925,076
// Patented Feb. 16, 1960

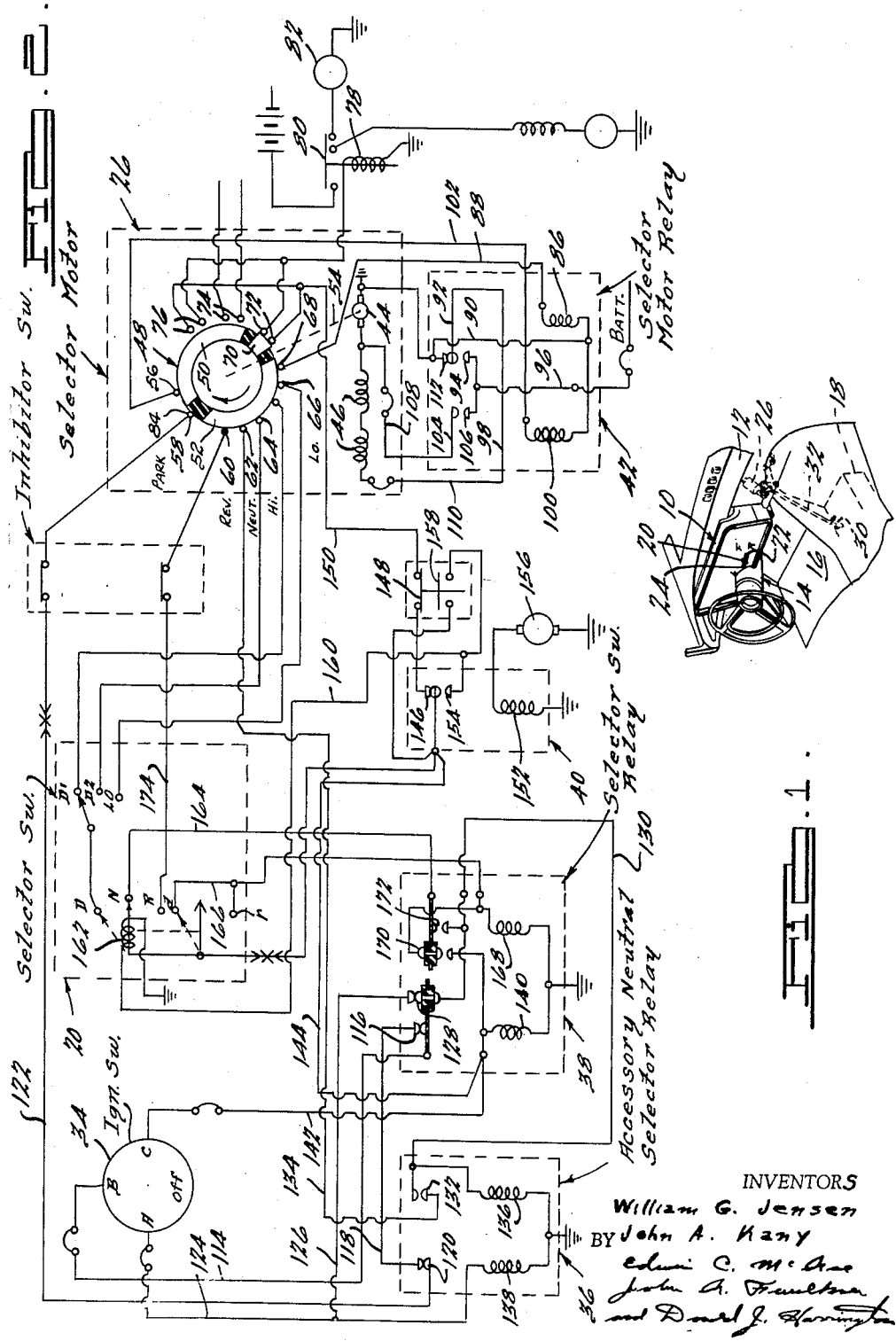

2,925,076

ELECTRICAL SWITCHING CIRCUIT FOR POWER TRANSMISSION MECHANISM RANGE SELECTOR

William G. Jensen and John A. Kany, Dearborn, Mich., assignors to Ford Motor Company, Dearborn, Mich., a corporation of Delaware Application March 26, 1957, Serial No. 648,572

3 Claims. (Cl. 123—179)

Our invention relates generally to multiple speed, power transmission mechanisms and more particularly to a manually operable means for initiating changes in the mode of cooperation of the various gear components of the transmission mechanism to establish the various shift sequences and to condition the transmission mechanism for neutral and for park.

Our invention includes portions which are particularly adapted to be conveniently mounted within the passenger compartment of a wheeled automotive vehicle in association with the vehicle power transmission controls and it comprises a switching circuit for energizing and de-energizing, as appropriate, a motor which in turn is positively connected to the control elements of an automatic power transmission. We contemplate that the improved circuit of our invention may be used with the controls for a variety of automatic transmissions and that a very minor degree of modification would be required to adapt the same for any given transmission installation. By preference, the switching circuit herein disclosed is adapted to be used with an automatic transmission wherein the transmission controls include a park device for locking the transmission tail shaft in a stationary position when the vehicle engine is inoperative. The circuit as disclosed further incorporates two forward drive ranges to condition the same for use with a dual range transmission, one range having three automatically selected torque multiplication ratios and the other having two such ratios. However, we emphasize that our improved circuit may be used with equal success with a transmission having only a single forward drive range.

The switching circuit of our instant invention further includes a simple, manually operable selector switch which may be conveniently mounted on the dash structure of the vehicle passenger compartment to enable the operator to initiate any of several transmission controlling functions. Various safety features are included in the circuit for overruling any erratic operation of the manually controlled selector switch which would be inconsistent with the existing operating parameters under any given driving condition. Other safety features are incorporated in the switching circuit to appropriately condition the transmission in the event that compensation is required for failures in the electrical control circuit.

The provision of an improved control system of the type above described being a principal object of our invention, it is a further object to provide an automatic power transmission control system which requires a minimum of attention by the vehicle operator and which is of simplified construction.

It is another object of our invention to provide a transmission control system as above set forth which may be readily adapted to be used with a variety of power transmission installations and which is substantially foolproof in operation.

It is another object of our invention to provide a control system as above set forth which is characterized by a high degree of safety and convenience and which includes a conveniently located operator controlled selector switch to enable the vehicle operator to initiate the various vehicle control functions, said switch being compatible with the interior styling of the passenger compartment and adapted to be located at a convenient location on the vehicle dash.

It is a further object of our invention to provide a switching circuit of the type above described which cooperates with the vehicle ignition and starter motor circuits to provide an automatic start when the vehicle ignition switch is closed.

Another object of our invention is to provide a switching circuit of the type above described which will cause the associated transmission to assume a park condition whenever the ignition switch is turned to the off or open circuit position. We further contemplate that the transmission will remain in the park condition after the ignition switch is turned on and during engine starting.

It is a further object of our invention to provide a switching circuit as set forth above wherein an electrical means is provided for holding the operator controlled selector switch in any of the preselected positions and wherein the selector switch will automatically return to a neutral position when the engine stalls while the transmission is in any of the operating drive ranges. Several other features and operational advantages of the improved system of our invention will readily become apparent from the following description of a preferred embodiment thereof and from the accompanying drawings wherein:

Figure 1 shows in part a typical installation of the improved system of our invention; and Figure 2 is a schematic drawing of the principal components of our improved control system.

Referring first to Figure 1, we have illustrated a portion of the interior of a passenger compartment of a present production automotive vehicle including a dash panel 10 situated on the forwardly located vehicle dash structure 12 and a steering wheel and column assembly 14. The vehicle body floor pan is shown at 16 and it partly encloses the vehicle power transmission mechanism schematically represented in part at 18. The dash panel 10 includes a manually operable electric selector switch 20 positioned at a convenient location within the reach of the vehicle operator, said switch by preference being bipartite in form and including a forward and reverse drive range selector portion 22 and an auxiliary low range selector portion 24, said selector portions being independently movable. We contemplate that the portion 24 of the selector switch will be infrequently actuated since those special driving conditions which would make a change in setting necessary would normally seldom occur.

The switch 20 forms a portion of the control circuit for regulating an electric motor 26 fixed to the dash structure 12 by a suitable bracket, said motor being positively linked to a control lever 30 mounted on the transmission mechanism 18 by means of a suitable linkage mechanism shown at 32. The motor 12 is capable of adjusting the position of the control lever 30 to initiate changes in the transmission operating ranges and the selector switch 20 forms a portion of the circuit for appropriately energizing the motor 26 in response to certain demands of the vehicle power delivery train.

Referring next to the schematic circuit diagram of Figure 2 for a complete understanding of the circuit, it should be kept in mind that the automatic transmission mechanism with which this particular circuit is to be used includes an automatic parking feature, a reverse drive range, neutral, a high drive range and an auxiliary low drive range. Any one of the drive ranges or neutral or park may be selected by the vehicle operator as desired.

The principal components of the circuit of Figure 2 include a vehicle ignition switch 34, the above mentioned selector switch 20, the above mentioned electric motor 26, an accessory neutral selector relay 36, a selector switch relay 38, an automatic start relay 40, and a selector motor relay 42. For a more complete understanding of the function and mode of operation of the motor 26 and the selector motor relay 42, reference may be made to the disclosure of co-pending application Serial No. 598,904, filed July 17, 1956, which is assigned to the assignee of the instant invention.

In general, the motor 26 includes a motor armature 44 and motor field windings 46. The armature is mechanically coupled to a rotatable selector switch comprising a rotatable switch element 48 which includes two arcuate contact segments 50 and 52. The mechanical connection between the armature 44 and the switch element 48 is schematically illustrated at 54 and the element 48 is adapted to rotate in unison with the motor 44. The major radii of the arcuate segments 50 and 52 are equal to each other and are adapted to slidably contact a plurality of contact points shown at 56, 58, 60, 62, 64, 66 and 68. In addition to the segments 50 and 52 the switch element 48 includes a third contact segment of reduced circumferential dimension as shown at 70, the major radius of the segment 70 being substantially greater than the corresponding radius of the segments 50 and 52. The segment 70 is adapted to slidably contact three pairs of electrical contact points shown at 72, 74 and 76, contacts 72 and 74 forming a portion of the circuit for a starter motor solenoid 78. A starter motor switch 80 cooperates with the solenoid 78 to open or close the energizing circuit for a starter motor 82.

During operation of the selector motor 27, any one of the contacts 58, 60, 62, 64 or 66 may be energized by the vehicle, ignition circuit and the remaining portions of the control circuit of Figure 2, subsequently to be described, make it possible for the desired electrical contact to become either automatically energized or de-energized as a result of a manual selection by the vehicle operator. In the particular circuit herein disclosed, the contact 58 is energized when it is desired to shift the associated transmission into park. Similarly, the contact 60 is energized to effect a transition to reverse drive range. The contact point 62 is energized to effect a neutral shift and the contacts 64 and 66 correspond to a high drive range and low drive range respectively. A non-conductive insulator section 84 separates the contact segments 50 and 52 and similar insulating sections are interposed between the contact segment 70 of the adjacent ends of the contact segments 50 and 52.

The mode of cooperation of the motor relay 42 with the motor 26 may best be explained by a statement of the operation. It may be observed from an inspection of Figure 2 that contact point 58 is in electrical contact with the insulator section 84. The motor armature 44 assumes a definite position corresponding to the position of the switch element 48 which is illustrated in Figure 2 and since the motor armature 44 is mechanically connected to the control elements of the transmission mechanism by means of linkage 32 and control lever 30, the position of the switch element 48 illustrated in Figure 2 is made to correspond to the park condition of the transmission controls.

If the vehicle operator desires to shift the transmission from the park position shown in Figure 2 to the position corresponding to a high operating range of the transmission, the contact point 64 is energized and the contact segment 52 completes a circuit from contact point 64 to contact point 68, the latter being electrically connected to a relay coil 86 through conductor 88. The coil 86 is then grounded through conductor 90. When the coil 86 is so energized, relay armature 92 moves in a downward direction as viewed in Figure 2 thus closing switch 94 and completing a circuit from the battery through conductor 96, switch 94, conductor 98, motor field windings 46 and motor armature 44 to ground. The armature 44 and field windings 46 thus act as a series motor and the switch element 48 is rotated in a counterclockwise direction until the insulator section 84 comes in contact with the contact point 64. When this happens the relay coil 86 is de-energized and the switch 94 is opened thus de-energizing the motor field windings 46 and armature 44. After counterclockwise rotation of the armature 44 is completed as above described, the transmission controls are conditioned for a high operating range.

To shift the transmission from park to reverse, to neutral or to low drive range, this same sequence in the operation of the various elements of the motor and motor relay would take place. However, the contact points 60, 62 or 66, as appropriate would be energized instead of contact point 64. Counterclockwise rotation of the switch element 48 would occur in each instance until the insulator section 84 is moved to the energized contact point.

In order to shift from high operating range to neutral, reverse or park, clockwise rotation of the switch element 48 is required. For example, if it is desired to shift from high operating range to reverse, contact point 60 is energized and the contact segment 50 provides a circuit between contact point 60 and contact point 56, the latter being electrically connected to relay coil 100 through conductor 102. The coil 100 is then grounded through conductor 90. When relay coil 100 is thus energized, relay armature 104 is moved in a downward direction as viewed in Figure 2 thus closing switch 106 and completing the circuit from the battery through conductor 96, through switch 106 and conductor 108 to the motor armature and then to ground. A parallel circuit is provided for the motor field windings 46 by the conductor 108, conductor 110 and switch 112, the latter assuming a closed position whenever the relay coil 86 is de-energized. The field windings 46 and the armature 44 thus function as a shunt motor to rotate the switch element 48 in a clockwise direction until the insulator section 84 comes in contact with the contact point 60 thus interrupting the above described circuit for the relay coil 100. This in turn causes the switch 106 to open thus interrupting the motor field and armature circuit. This same sequence is followed whenever the switch element 48 is rotated in a clockwise direction.

The motor circuit above described further includes a dynamic braking feature whenever the motor circuit is interrupted while the armature and switch element 48 are rotating in a clockwise direction. Note that when the switch 106 is opened as above described, the source of electrical energy for the armature 44 and the field windings 46 is interrupted and this causes a rapid decrease in the flux density in the motor field. This rate of change in the flux density initiates a residual current in the armature windings which in turn tends to augment the flux density and to resist the rate of decrease in the field strength. This action creates a braking torque on the motor armature 44 and it prevents hunting or overriding of the switching element 44 once the motor relay circuit has been interrupted. This dynamic braking feature is made possible by reason of the parallel motor windings since a closed circuit exists for the armature 44 and the field windings 46, said closed circuit being defined by the conductor 110, the conductor 98, relay armature 102 and switch 112.

The ignition switch as schematically illustrated at 34 is provided with a continuously energized battery terminal B, an accessory terminal A, an ignition coil terminal C and an off position. When the ignition switch is turned to the accessory position, terminal A becomes connected to terminal B and terminal C remains de-energized. When the ignition switch is turned toward the coil position C, both terminals A and C become connected to terminal B.

When the ignition switch is turned to the off position terminals A and C are de-energized and the park contact point 58 becomes electrically connected to battery terminal B through conductor 114, switch 116, conductor 118, switch 120 and conductor 122. It is thus apparent that the transmission will assume a park condition whenever the ignition switch 34 is turned to the off position.

When the ignition switch 34 is turned to the accessory position, terminal A becomes energized and a circuit is established between the neutral contact point 62 of motor selector switch and the battery terminal A. This circuit is defined by conductors 124 and 126, switch 128, conductor 130, switch 132, and conductor 134. The switch 132 is closed when the ignition switch 34 assumes the accessory position since the associated relay coil 136 is energized by the parallel electrical path established therethrough from the conductor 130 to the ground. Simultaneously with the establishment of the above defined neutral circuit, the relay coil 138 becomes energized by reason of the parallel electrical path established therethrough from the conductor 134 to the ground. When the relay coil 138 is thus energized the armature for the switch 120 assumes an open position thereby braking the above described park circuit to allow the transmission to assume a neutral condition and to permit an appropriate movement of the motor armature 44 and the selector switch element 48.

When the ignition switch 34 is turned to the coil position, terminal C becomes energized and relay coil 140 of the selector switch relay becomes energized by reason of the electrical path provided by conductor 142, one side of the coil 140 being grounded as indicated. Relay 140 thus opens the switch 128 thereby interrupting the neutral circuit above described. Relay coil 136 is thus de-energized and the switch 132 opens thereby providing a second interruption in the neutral circuit. Switch 116 also opens simultaneously with the switch 128 since it is situated therewith on a common armature. The provision of the relay coil 136 and switch 132 becomes necessary in order to prevent an undesirable leakage of current from the park electrical contact 58 to the neutral electrical contact 62 of the selector motor switch. When the switch element 48 assumes the forward drive or a low range position, the presence of the switch 132 serves to interrupt an otherwise complete circuit under these conditions to the relay coil. The latter would normally tend to open and close switch 120 and cause the same to vibrate in a manner similar to the armature of a common door bell.

When the ignition switch 34 is turned to the coil position C as above indicated, conductor 144 also becomes energized and if it is assumed that the selector motor relay switch element 48 is in the park position as indicated in the drawing, a complete circuit for the starter solenoid will be established, said circuit being defined in part by generator output switch 146 and manifold vacuum responsive switch 148, a conductor 150 and contact points 72. It is thus apparent that the starter motor 82 will begin to crank the engine immediately upon turning the ignition switch to the coil position. When the engine fires, a vacuum will be established in the intake manifold thereby opening switch 148 and interrupting the starter motor circuit. Similarly, the starter motor circuit will be interrupted by switch 146 when the engine fires since the generator output will be sufficient to energize relay coil 152 which in turn will open switch 146 and close switch 154, the engine generator being designated in Figure 2 by numeral 156. When the vacuum switch 148 opens, an associated switch 158 simultaneously closes thereby establishing the connection between conductor 144 and conductor 160, extending to a holding coil 162 associated with a movable portion of the above mentioned manually operable selector switch 20. The switch 154 also establishes a parallel connection between conductors 144 and 160 to supplement the operation of switch 158. The generator switch 146 and the vacuum switch 148 cooperate to provide double protection and the starter motor and the associated switches 154 and 158 provide assurance that the holding coil 162 will always remain energized once the engine has fired. Should the generator fail to operate for some reason after the engine fires, the vacuum switch 148 will make certain that the starter motor circuit is opened. On the other hand, if the engine is raced when the transmission is in neutral or park the vacuum could conceivably decrease to the point where switch 148 would close but the starter motor circuit would remain open by reason of the operation of the switch 146.

The vehicle operator may manually select forward drive range or neutral range as desired merely by operating the switch 20 located on the dash panel. If the switch 20 is moved from the position shown in Figure 2 to the drive position D, an electrical connection will be established between conductor 144 and a conductor extending to selector switch segment 52. Simultaneously, a second contact portion of the switch 20 will establish an electrical connection by the conductor 144 and terminal d of a conductor 166. The conductor 166 is connected to ground through relay coil 168 thereby energizing the same which in turn causes switches 170 and 172 to close. The switch 170 thus establishes a parallel connection between conductor 142 and relay coil 168 for energizing the latter so that switches 170 and 172 will remain closed regardless of any subsequent movement of the selector switch 20.

The holding coil 162 acts as a detent for maintaining the movable portions of the selector switch 20 in any position which is selected by the vehicle operator. The selector switch is normally spring loaded toward the neutral position and if the engine should stall, either one or both of the switches 154 and 158 would be opened thereby interrupting the holding coil circuit. The selector switch would thus immediately assume a neutral position and the engine would begin to crank automatically until the engine begins to fire whereupon the generator or vacuum switches would interrupt the starter motor circuit as above described and the holding coil would again be energized. The vehicle operator would then be able to shift to either the drive range or the reverse range as desired.

Once the selector switch 20 has been moved to either the forward drive or the reverse positions, the relay coil 168 remains energized thereby permitting the above described automatic shift to neutral when the engine stalls and also permitting a deliberate shift to neutral by the operator while the engine is running. The contact switch 172 makes such a shift possible since it is maintained in a closed position by the coil 168.

It is emphasized that the transmission may assume a park condition after the ignition switch is turned from an off position to the coil position even though the selector switch 20 will be in a so called neutral position. Automatic starting will be accomplished as above described since the segment 70 will close the contact points 72. However, after the selector switch 20 has been moved to either of the drive or reverse positions, a subsequent shift of the selector switch to the neutral position will always be accompanied by a corresponding shift in the selector motor switch to the neutral position. Automatic starting will be accomplished in this latter instance since sector 70 of the selector motor switch element 48 will close contact points 76.

It will be noted that when the selector switch 20 is moved to the reverse position R, the contact point 60 of the selector motor switch element 48 is energized by means of the conductor 174. The auxiliary movable portion of the selector switch 20 will provide an electrical connection between the conductors 144 and 166, terminal r being provided for this purpose. When the selector motor switch element 48 assumes a reverse position the segment 70 will close contact points 74 to energize the associated back-up lamp circuit.

If desired, an inhibitor switch may be incorporated in the electrical conductors 172 and 174 to prevent a shift into reverse or park while the vehicle is traveling at unsafe speeds. The inhibitor switch may be made speed responsive so that the limiting speed for a reverse shift will be approximately ten miles per hour and the limiting speed for a shift into park will be two to three miles per hour.

The above-mentioned auxiliary selector switch 24 may be utilized as viewed in Figure 2 whenever the main portion of the switch has been moved to the drive position D. If the transmission is a dual range transmission, either of the two ranges may be selected as desired. Also a low drive range may be selected as appropriate. Corresponding contact points are provided on the selector motor switch element 48 and they are connected with the appropriate terminals on the manual selector switch by suitable conductors as indicated in Figure 2.

What we claim and desire to secure by United States Letters Patent is:

1. In a range selector mechanism for an automatic, power transmission mechanism for delivering power from a vehicle engine to a driven member, said engine being characterized by an air intake manifold and a driven electrical voltage generator: the combination of an electric motor adapted to adjustably position movable transmission mechanism control elements, a motor circuit connecting said motor to a source of electrical potential, a switching mechanism forming a part of said motor circuit and adapted to selectively energize said motor to effect a predetermined degree of rotation thereof in either direction, an engine starter motor solenoid and a circuit for energizing the same, said last named circuit being defined in part by a portion of said switching mechanism and closed thereby when said switching mechanism is in a preselected operating condition, an engine manifold pressure responsive switch means and a generator voltage responsive switch means located in series and forming a part of said starter motor solenoid circuit for interrupting the latter when the engine is operating.

2. In a range selector for an automatic, power transmission mechanism for use with an engine powered vehicle, the engine for said vehicle being characterized by an air intake manifold and an engine driven voltage generator: the combination of an electric motor adapted to adjustably position movable transmission mechanism control elements, a rotary switch drivably coupled to said motor and comprising spaced arcuate contact segments separated by an electric insulator, a plurality of electric terminals slidably contacting said arcuate segments, said motor including a motor field, a dual circuit means for energizing said field including separate portions for respectively producing opposed polarities to effect rotation of said segments in alternately opposed directions, one of said terminals continuously engaging one of said segments and another terminal continuously engaging said other segment, said one and said other terminals respectively forming a portion of each of said separate portions of said dual circuit means, a source of electrical potential, a switching circuit means for selectively and separately energizing each of the remaining terminals to establish a complete circuit for said motor field, said segments being rotated in one direction when an energized terminal contacts one of said segments and in the other direction when an energized terminal contacts another segment, said switch rotating until said insulator contacts said energized terminal thereby interrupting the motor field circuit, additional ones of said contacts being situated at angularly spaced locations, said additional terminals respectively corresponding to forward, neutral and reverse driving ranges of said transmission, and electrical conduits including a manually operable selector switch means for connecting each terminal contact with said selector potential source, said switch means including a movable switch element with a plurality of operating positions corresponding to said terminals for selectively energizing the latter, an electrical solenoid detent means for maintaining said movable switch element at any selected position, a vehicle engine starter motor solenoid circuit, switch terminals located adjacent said segments and forming a portion of said starter motor solenoid circuit, said rotary switch further comprising a third switch segment adapted to rotate with said rotary switch and to close said switch terminals when said rotary switch assumes a neutral position, said starter motor circuit forming an electrical connection with said potential source, an engine manifold pressure responsive switch and generator voltage responsive switch located in series and forming part of said starter motor solenoid circuit and for interrupting the latter when the engine is operating.

3. The combination as set forth in claim 2 wherein said electrical solenoid detent means includes an energizing circuit, said manifold pressure responsive switch and said generator voltage responsive switch being disposed in said energizing circuit for said detent means, the latter switches being double acting and adapted to close the energizing circuit for said detent means when the engine starter motor solenoid circuit is opened thereby.

References Cited in the file of this patent

UNITED STATES PATENTS

| | | |
|---|---|---|
| 2,102,598 | McDill | Dec. 21, 1937 |
| 2,204,065 | Berzer | June 11, 1940 |
| 2,610,518 | Goedeke et al. | Sept. 16, 1952 |
| 2,622,230 | Mason | Dec. 16, 1952 |
| 2,676,289 | Wulfsberg et al. | Apr. 20, 1954 |